United States Patent
Lu

(10) Patent No.: US 8,920,914 B2
(45) Date of Patent: Dec. 30, 2014

(54) ENHANCED PROCESSING ORIENTED POLYPROPYLENE FILMS

(75) Inventor: Pang-Chia Lu, Pittsford, NY (US)

(73) Assignee: Jindal Films Americas LLC, Macedon, NY (US)

( * ) Notice: Subject to any disclaimer, the term of this patent is extended or adjusted under 35 U.S.C. 154(b) by 214 days.

(21) Appl. No.: 13/217,854

(22) Filed: Aug. 25, 2011

(65) Prior Publication Data

US 2013/0052441 A1 Feb. 28, 2013

(51) Int. Cl.
| | | |
|---|---|---|
| *B32B 27/08* | (2006.01) | |
| *B32B 27/32* | (2006.01) | |
| *C08L 23/14* | (2006.01) | |
| *B29C 55/08* | (2006.01) | |
| *B29C 55/06* | (2006.01) | |
| *C08L 23/16* | (2006.01) | |
| *B29K 23/00* | (2006.01) | |

(52) U.S. Cl.
CPC .............. *C08L 23/142* (2013.01); *B32B 27/32* (2013.01); *B32B 2439/00* (2013.01); *B29C 55/08* (2013.01); *B29C 55/06* (2013.01); *C08L 23/16* (2013.01); *B32B 27/08* (2013.01); *B29K 2023/10* (2013.01)
USPC .......................................... 428/220; 428/516

(58) Field of Classification Search
None
See application file for complete search history.

(56) References Cited

U.S. PATENT DOCUMENTS

| | | |
|---|---|---|
| 6,303,233 B1 | 10/2001 | Amon et al. |
| 7,537,829 B2 | 5/2009 | Pellingra, Jr. et al. |
| 2003/0143357 A1 | 7/2003 | Frauenhofer |
| 2007/0082157 A1 | 4/2007 | Heater et al. |
| 2007/0292682 A1 | 12/2007 | Lee et al. |
| 2009/0087648 A1 | 4/2009 | Lee |
| 2009/0105418 A1* | 4/2009 | Dharmarajan et al. ......... 525/95 |
| 2009/0136698 A1 | 5/2009 | Rehkugler et al. |

FOREIGN PATENT DOCUMENTS

| | | |
|---|---|---|
| WO | WO 2010/047905 | 4/2010 |
| WO | WO 2010/120295 | 10/2010 |

* cited by examiner

*Primary Examiner* — Sheeba Ahmed

(57) ABSTRACT

Described is a film, a method of making the film, and a method of packaging articles with the film, the film oriented in at least one direction, and comprising a core layer comprising polypropylene comprising from 0 wt % to 2 wt % comonomer-derived units, from 1 wt % to 20 wt %, by weight of the core layer, of propylene-α-olefin elastomer, and from 1 wt % to 20 wt %, by weight of the core layer, of hydrocarbon resin possessing a softening point of from greater than 100° C.

10 Claims, 2 Drawing Sheets

ENHANCED PROCESSING ORIENTED POLYPROPYLENE FILMS

FIELD OF THE INVENTION

The present invention relates in general to oriented polypropylene films, and more particularly to desirable combinations of processing agents to enhance the processability of polypropylene films while maintaining desirable physical characteristics.

BACKGROUND

Oriented polypropylene films are useful for wrapping, bagging, and otherwise "enveloping" many types of products from food items to hardware. Due to the heavy volume of oriented polypropylene film used by packagers, there is always a desire to downgauge to save money and weight. But, in order to do this the polypropylene compositions used to make the films must be able to make films at least as strong, for example by having the same modulus, as those of the original film. While this may be accomplished by, for example, using highly crystallizable polypropylene, there is usually a tradeoff in processability. The tougher the film is, typically, the tougher it is to extrude and stretch. What would be desirable is a polypropylene composition that can be used to make strong (high modulus) films while also being easily processable, or at least as processable as its thicker counterpart. The inventor here has accomplished this.

Examples of using hydrocarbon resins in the core layer of polypropylene films can be found in US 2007/0082157. Other related publications that disclose "soft" polymers in the core layer include WO 2010/047905, WO 2010/120295, US 2003/0143357, US 2007/0292682, US 2009/0087648, US 2009/0136698, U.S. Pat. Nos. 7,537,829, and 6,303,233.

SUMMARY

Described in one aspect is a film oriented in at least one direction, the film comprising a core layer comprising polypropylene comprising from 0 wt % to 2 wt % comonomer-derived units, from 1 wt % to 20 wt %, by weight of the core layer, of propylene-α-olefin elastomer, and from 1 wt % to 20 wt %, by weight of the core layer, of hydrocarbon resin possessing a softening point of from greater than 100° C. Desirably, the balance of the core layer is made up of the polypropylene, and in particular embodiments the core layer comprises from 60 wt % or 65 wt % or 70 wt % or 75 wt % or 80 wt % to 90 wt % or 95 wt % or 98 wt % of the polypropylene.

Described in another aspect is a method of forming a film comprising: melt extruding a composition comprising (a) polypropylene comprising from 0 wt % to 2 wt % comonomer-derived units, (b) from 1 wt % to 20 wt %, by weight of the material in the extruder, of a propylene-α-olefin elastomer and (c) from 1 wt % to 20 wt %, by weight of the material in the extruder, of a hydrocarbon resin possessing a softening point of from greater than 100° C.; wherein the extruder motor amperage is from at least 2% less than the extruder motor amperage when only the polypropylene is melt extruded through the same extruder; forming a film; and orienting the film in either the machine or transverse direction, wherein the amperage on the pulling (tenter or roller) motor is from at least 5% less than the pulling motor amperage when only the polypropylene is oriented in the same direction at the same temperature. Desirably, the balance of the material in the extruder (and hence, final core layer of film formed) is made up of the polypropylene.

Described in yet another aspect is a method of enveloping an article(s) comprising providing a vertical or horizontal form, fill, and seal apparatus having a drawing means for drawing a roll of film in its machine direction with a force of at least 150 kpsi; forming a pouch for receiving the article(s) by applying a force in the transverse direction of the film with a force of at least 150 kpsi; placing the article(s) in the pouch; and heat-sealing the pouch to envelope the article(s) with a heat-seal temperature of from 100° C. to 130° C.; wherein the film is oriented in at least one direction as wound in a roll, the film comprising a core layer comprising polypropylene comprising from 0 wt % to 2 wt % comonomer-derived units, from 1 wt % to 20 wt %, by weight of the core layer, of propylene-α-olefin elastomer, and from 1 wt % to 20 wt %, by weight of the core layer, of hydrocarbon resin possessing a softening point of from greater than 100° C. Desirably, the balance of the core layer of the film is made up of the polypropylene.

DETAILED DESCRIPTION

Figure 1:
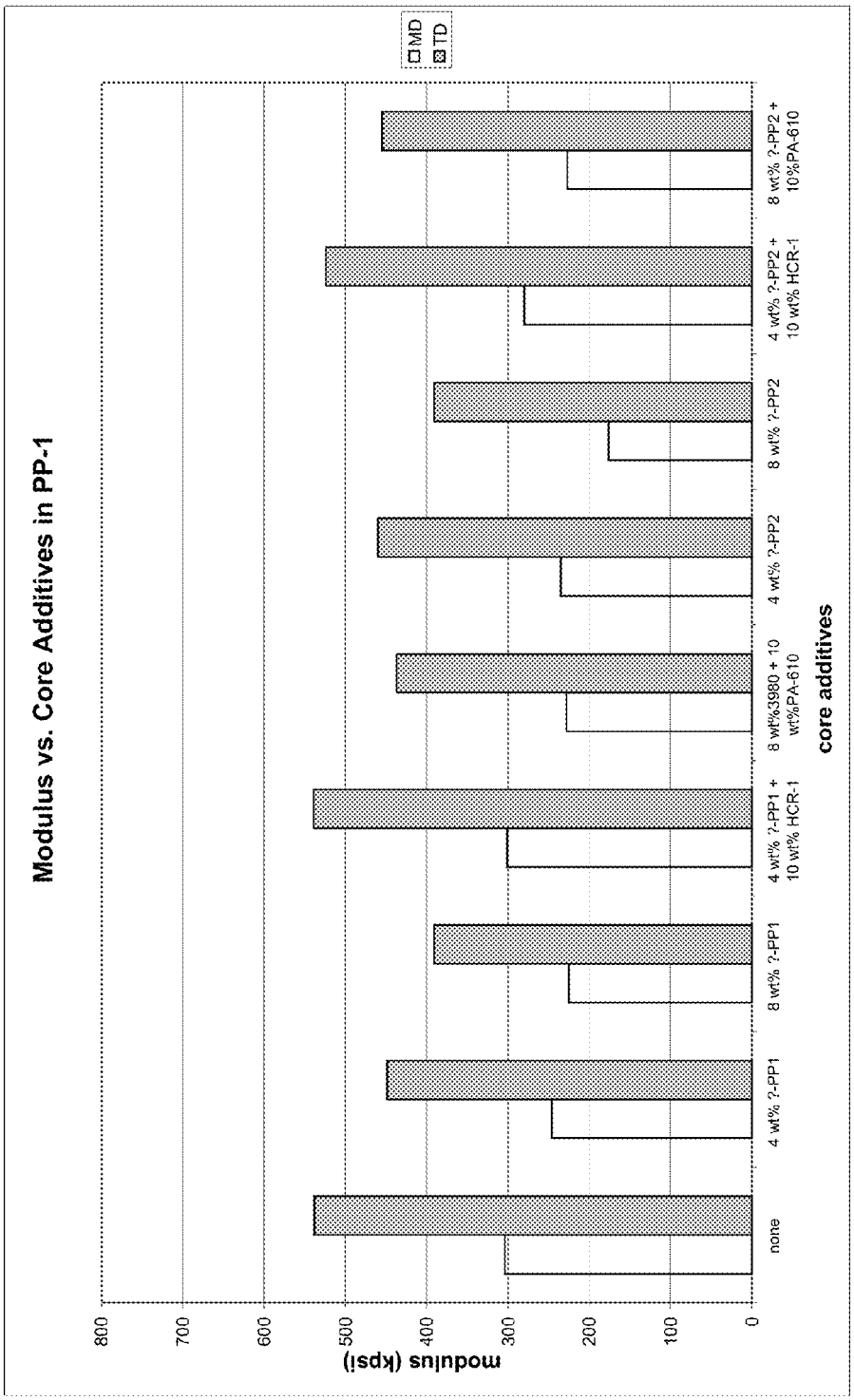
FIG. 1 is a bar graph showing the Modulus for the various core compositions for the films described herein using the "PP-1", described in Table 1.
Figure 2:
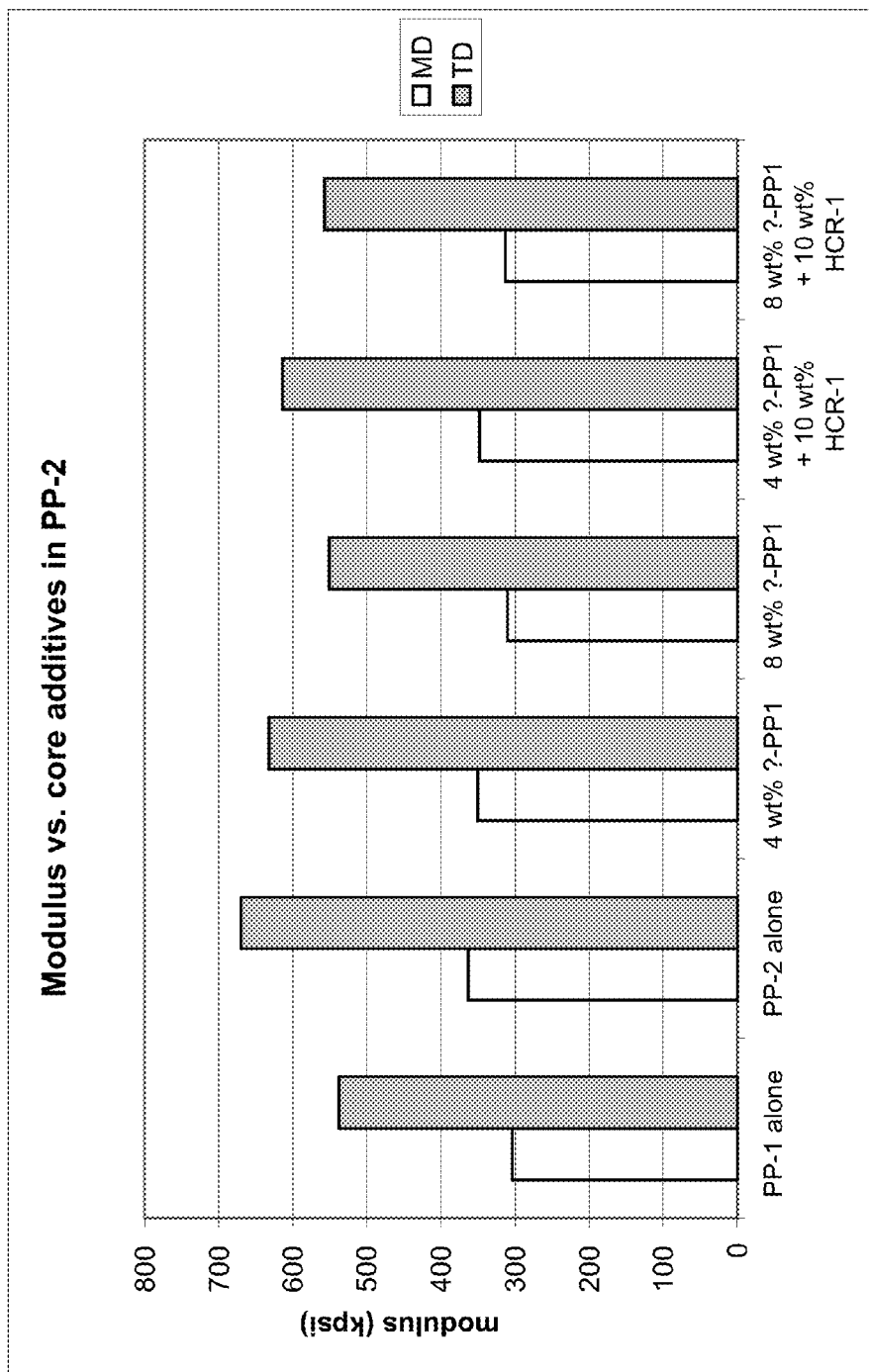
FIG. 2 is a bar graph showing the Modulus for the various core compositions for the films described herein using the "PP-2", a highly crystalline polypropylene described in Table 1.

Described herein is a core film composition for oriented polypropylene films that has improved processability and improved strength. The improved processability is found, for instance, by observing the amperage or force used to draw the films in the machine direction ("MD") or the transverse ("TD") direction and/or to extrude the molten film composition through an extruder. The improvement is achieved by a combination of relatively low amounts of a propylene-α-olefin elastomer and hydrocarbon resin with the polypropylene, preferably a highly crystalline polypropylene as judged by its melting point. The improvement by adding low amounts of the propylene-α-olefin elastomer alone makes the core compositions described herein suitable for packaging articles(s) on common horizontal or vertical form, fill, and seal units.

In one embodiment is provided a film oriented in at least one direction, either the TD or MD, preferably both, the film comprising a core layer comprising polypropylene comprising from 0 wt % to 0.5 wt % or 1 wt % or 2 wt % comonomer-derived units, from 1 wt % to 5 wt % or 8 wt % or 10 wt % or 20 wt %, by weight of the core layer, of propylene-α-olefin elastomer, and from 1 wt % to 5 wt % or 8 wt % or 10 wt % or 20 wt %, by weight of the core layer, of hydrocarbon resin possessing a softening point of from greater than 100° C. or more as described herein, wherein the balance of the core layer is the polypropylene. In any of the described variations herein, the core layer can consist essentially of one polypropylene, one propylene-elastomer, and one hydrocarbon resin, and in very particular embodiments can consist of these components. By "consisting essentially of" what is meant is that the core can also include other minor components, such as anti-slip agents, anti-oxidant agents, anti-blocking agents, fillers and cavitation agents, and other common minor components as long as they do not change the claimed properties of the composition or film by any more than 1% or 2% or 3%.

Also, when referring to the composition "comprising polypropylene," or other component, it is understood that this includes a mixture of the named component having the claimed features.

The "polypropylene" is a polymer comprising from 98 wt % to 100 wt % propylene-derived units and can be made by any desirable process using any desirable catalyst as is known in the art, such as a Ziegler-Natta catalyst, a metallocene catalyst or other single-site catalyst, using solution, slurry, high pressure, or gas phase processes. The polypropylenes have a melting point determined by ASTM D3418 of at least 130° C. or 140° C., or within a range from 130° C. to 180° C. A "highly crystalline" polypropylene is a preferred polypropylene useful in certain embodiments, and is typically isotactic and comprises 100 wt % propylene-derived units (propylene homopolymer) and has a relatively high melting point of from greater than (greater than or equal to) 140° C. or 145° C. or 150° C. or 155° C. or 160° C. or 165° C. as measured by ASTM D3418.

The term "crystalline," as used herein, characterizes those polymers which possess high degrees of inter- and intra-molecular order. In certain embodiments, the polypropylene has a heat of fusion ($H_f$) greater than 60 J/g or 70 J/g or 80 J/g, as determined by DSC analysis. The heat of fusion is dependent on the composition of the polypropylene; the thermal energy for the highest order of polypropylene is estimated at 189 J/g that is, 100% crystallinity is equal to a heat of fusion of 189 J/g. A polypropylene homopolymer will have a higher heat of fusion than a copolymer or blend of homopolymer and copolymer.

In any case, in certain embodiments, the polypropylene has a melt flow rate ("MFR", 230° C., 2.16 kg, ASTM D1238) within the range of from 0.1 or 0.5 or 1 to 4 or 6 or 8 or 10 or 12 or 16 or 20 g/10 min. Also, in any case, the polypropylene may have a molecular weight distribution (determined by GPC) of from 1.5 or 2.0 or 2.5 to 3.0 or 3.5 or 4.0 or 5.0 or 6.0 or 8.0. Suitable grades of polypropylene, and in particular, highly crystalline polypropylenes that are useful in oriented films include those made by ExxonMobil, LyondellBasell, Total, Borealis, Japan Polypropylene, Mitsui, and other sources.

Certain hydrocarbon resins are found to be useful to preserve the film's desirable properties, such as a high modulus. The hydrocarbon resin may be a thermally polymerized dicyclopentadiene resin which is preferably hydrogenated to achieve transparency and minimize discoloration. The hydrocarbon resin may also be a catalytically polymerized resin made using a Friedel-Crafts catalyst, such as boron or aluminum halides. The hydrocarbon resin may be a cycloaliphatic resin or contain appropriate levels of aromatics. Such hydrocarbon resins are typically used as a master batch in polypropylene, typically from 40 wt % to 60 wt % masterbatch of hydrocarbon resin in polypropylene. A particularly useful hydrocarbon resin will have a softening point of from greater than 100° C. In other embodiments, the softening point of the hydrocarbon resin is greater than 110° C. or 120° C.; or within a range of from 100° C. or 110° C. or 120° C. to 150° C. or 160° C. or 180° C. or 200° C., as measured by ASTM D1525. In other embodiments, the glass transition temperature, Tg, of the hydrocarbon resin is greater than 25° C. or 30° C. or 35° C. or 40° C. or 50° C. as measured by ASTM D5992.

Specific examples of commercially available hydrocarbon resins include Oppera™ RP 100, 101, 102, 103, 104, 105, 106, 111, 112, 115, and 120 materials, and Oppera PR 131 hydrocarbon resins, all available from ExxonMobil Chemical Company. The preceding examples are illustrative only and by no means limiting.

To improve the processability of polypropylene, especially highly crystalline polypropylene, it is desirable to add an agent that is miscible with the polypropylene but adds some softness. As used herein, a "propylene-α-olefin elastomer" refers to a random copolymer that is elastomeric, has moderate crystallinity and possesses propylene-derived units and one or more units derived from ethylene, higher α-olefins, and/or optionally diene-derived units. Added to the core compositions herein are so called propylene-α-olefin elastomers which are propylene-based polymers having an intermediate amount of α-olefin such as between 4 wt % and 25 wt %, and more particularly between 8 wt % and 25 wt %. In some embodiments, where more than one comonomer is present, the amount of a particular comonomer may be less than 5 wt %, but the combined comonomer content is greater than 5 wt %. The propylene-α-olefin elastomers may be described by any number of different parameters, and those parameters may comprise a numerical range made up of any desirable upper limit with any desirable lower limit as described herein.

In certain embodiments, the propylene-α-olefin elastomer comprises ethylene or $C_4$-$C_{10}$ α-olefin-derived units (or "comonomer-derived units") within the range of 4 wt % or 7 wt % or 9 wt % to 13 wt % or 16 wt % or 18 wt % or 20 wt % or 25 wt % by weight of the elastomer. The propylene-α-olefin elastomer may also comprise two different comonomer-derived units. Also, these copolymers and terpolymers may comprise diene-derived units as described below. In a particular embodiment, the propylene-α-olefin elastomer comprises propylene-derived units and comonomer units selected from ethylene, 1-hexene, and 1-octene. And, in a more particular embodiment, the comonomer is ethylene, and, thus, the propylene-α-olefin elastomer is a propylene-ethylene copolymer. When dienes are present, the propylene-α-olefin elastomer comprises less than 5 wt % or 3 wt %, by weight of the elastomer, of diene derived units, or within the range from 0.1 wt % or 0.5 wt % or 1 wt % to 5 wt % in other embodiments. Suitable dienes include for example: 1,4-hexadiene, 1,6-octadiene, 5-methyl-1,4-hexadiene, 3,7-dimethyl-1,6-octadiene, dicyclopentadiene (DCPD), ethylidiene norbornene (ENB), norbornadiene, 5-vinyl-2-norbornene (VNB), and combinations thereof.

In particular embodiments, the propylene-α-olefin elastomers comprise from 8 wt % or 10 wt % or 12 wt % to 16 wt % or 18 wt % or 20 wt % or 25 wt % ethylene-derived units. These polymers may have some isotactic polypropylene sequences but they also have some amorphous regions in the polymer chains, thus imparting desirable qualities to them and the compositions in which they are blended. In certain embodiments, the propylene-α-olefin elastomers have a melting point of less than 140° C. or 130° C. or 120° C. or 110° C. or 100° C. One or a mixture of propylene-α-olefin elastomers may be present in the core compositions, preferably only one.

In certain embodiments, the propylene-α-olefin elastomers have a heat of fusion ($H_f$), determined according to the Differential Scanning calorimetry (DSC) procedure described herein within the range from 0.5 or 1 or 5 J/g to 35 or 40 or 50 or 65 or 75 J/g. In certain embodiments, the $H_f$ value is less than 75 or 60 or 50 or 40 J/g. In certain embodiments, the propylene-α-olefin elastomers have a percent crystallinity within the range from 0.5% to 40%, and from 1% to 30% in another embodiment, and from 5% to 25% in yet another embodiment, wherein "percent crystallinity" is determined according to the DSC procedure described herein. The thermal energy for the highest order of polypropylene is estimated at 189 J/g (i.e., 100% crystallinity is equal to 189 J/g).

In particular embodiments, the propylene-α-olefin elastomers have a single peak melting transition as determined by DSC; in certain embodiments the propylene-α-olefin elastomer has a primary peak melting transition at from less than 90° C., with a broad end-of-melt transition at greater than about 110° C. The peak "melting point" ($T_m$) is defined as the temperature of the greatest heat absorption within the range of melting of the sample. However, the propylene-α-olefin elastomer may show secondary melting peaks adjacent to the principal peak, and/or the end-of-melt transition, but for purposes herein, such secondary melting peaks are considered together as a single melting point, with the highest of these peaks being considered the $T_m$ of the propylene-α-olefin elastomer. In very particular embodiments, the propylene-α-olefin elastomers have a peak melting temperature ($T_m$) from less than 70° C. or 80° C. or 90° C. or 100° C. or 105° C. in certain embodiments; and within the range from 10° C. or 15° C. or 20° C. or 25° C. to 65° C. or 75° C. or 80° C. or 95° C. or 105° C. in other embodiments.

The procedure for DSC determinations (for the polypropylene and elastomer) is as follows. About 0.5 grams of polymer was weighed out and pressed to a thickness of about 15-20 mils (about 381-508 microns) at about 140° C.-150° C., using a "DSC mold" and Mylar™ as a backing sheet. The pressed pad was allowed to cool to ambient temperature by hanging in air (the Mylar was not removed). The pressed pad was annealed at room temperature (about 23° C.-25° C.) for about 8 days. At the end of this period, an about 15-20 mg disc was removed from the pressed pad using a punch die and was placed in a 10 microliter aluminum sample pan. The sample was placed in a differential scanning calorimeter (Perkin Elmer Pyris 1 Thermal Analysis System) and was cooled to about −100° C. The sample was heated at about 10° C./min to attain a final temperature of about 165° C. The thermal output, recorded as the area under the melting peak of the sample, is a measure of the heat of fusion and can be expressed in Joules per gram (J/g) of polymer and was automatically calculated by the Perkin Elmer System. Under these conditions, the melting profile shows two (2) maxima, the maxima at the highest temperature was taken as the melting point within the range of melting of the sample relative to a baseline measurement for the increasing heat capacity of the polymer as a function of temperature.

In certain embodiments, the propylene-α-olefin elastomers have a melt flow rate ("MFR," ASTM D1238, 2.16 kg, 230° C.), within the range from 0.5 or 1 or 1.5 or 2 to 4 or 6 12 or 16 or 20 g/10 min in other embodiments.

In certain embodiments, the molecular weight distribution (MWD) of the propylene-α-olefin elastomers is within the range from 1.5 or 1.8 or 2.0 to 3.0 or 3.5 or 4.0 or 5.0. Techniques for determining the molecular weight (Mn, Mz and Mw) and molecular weight distribution (MWD) are as follows, and as in Verstate et al. in 21 MACROMOLECULES 3360 (1988). Conditions described herein govern over published test conditions. Molecular weight and molecular weight distribution are measured using a Waters 150 gel permeation chromatograph equipped with a Chromatix KMX-6 on-line light scattering photometer. The system was used at 135° C. with 1,2,4-trichlorobenzene as the mobile phase. Showdex™ (Showa-Denko America, Inc.) polystyrene gel columns 802, 803, 804, and 805 are used. This technique is discussed in LIQUID CHROMATOGRAPHY OF POLYMERS AND RELATED MATERIALS III 207 (J. Cazes ed., Marcel Dekker, 1981).

The propylene-α-olefin elastomers described herein can be produced using any catalyst and/or process known for producing polypropylenes. In certain embodiments, the propylene-α-olefin elastomers can include copolymers prepared according to the procedures in WO 02/36651, U.S. Pat. No. 6,992,158, and/or WO 00/01745. Preferred methods for producing the propylene-α-olefin elastomers are found in US Patent Application Publication 2004/0236042 and U.S. Pat. No. 6,881,800. Preferred propylene-α-olefin elastomers are available commercially under the trade names Vistamaxx™ (ExxonMobil Chemical Company, Houston, Tex., USA) and Versify™ (The Dow Chemical Company, Midland, Mich., USA), certain grades of Tafmer™ XM or Notio™ (Mitsui Company, Japan) or certain grades of Softel™ (Lyondell-Basell Polyolefins of the Netherlands).

In preferred embodiments styrenic copolymers, such as, for example, styrene butadiene, styrene co-ethylene-butene, and other styrenic copolymers, terpolymers and so called styrenic block copolymers are substantially absent from the core composition used to make the core layer, thus substantially absent from the core layer, meaning that they are present, if at all, to an extent no greater than 0.1 wt % or 1 wt %, and preferably are absent from the core layer.

The polymers described herein can be combined in any conventional manner to form the core film layer. As used herein, the term "layer" refers to each of the one or more materials, the same or different, that are secured to one another in the form of a thin sheet or film by any appropriate means, such as by an inherent tendency of the materials to adhere to one another, or by inducing the materials to adhere as by a heating, radiative, chemical, or some other appropriate process. The term "layer" is not limited to detectable, discrete materials contacting one another such that a distinct boundary exists between the materials. Preferably, however, the materials used to make one layer of a film will be different (i.e., the weight percent of components, the properties of each component, and/or the identity of the components may differ) from the materials used to make an adjacent, and adhering, layer. The term "layer" includes a finished product having a continuum of materials throughout its thickness. The "films" described herein comprise three or more layers, and may comprise 3, 4, 5, or more layers in particular embodiments.

As mentioned, the core composition can be varied to achieve a desired processability and strength. Also present in certain embodiments of the films described herein are so called "skin" layers of 0.1 or 0.5 to 2 or 3 μm thickness; where the core layer can be from 15 or 17 or 18 to 20 or 22 or 24 or 26 μm thickness. In particular, the core layer may be described as having a first and second side, wherein the film further comprises (or consists essentially of) one or more skin layers adjacent to each of the first and second sides, the skin layers comprising (or consisting essentially of) a polyethylene, a propylene-ethylene-butene terpolymer, or a blend thereof. These compounds are well known in the art.

In particular, the skin layer(s) may be present in certain embodiments of this invention. When present, the first skin layer may be contiguous to a side of the core layer. In other multi-layer embodiments, one or more other layers may be intermediate the first skin layer and the core layer. The first skin layer may include a polymer that is suitable for heat-sealing or bonding to itself when crimped between heated crimp-sealer jaws. The skin layer may also increase the impact strength of the overall structure. In some preferred embodiments, the skin layer comprises at least one polymer selected from the group consisting of propylene homopolymers, ethylene-propylene random copolymers, propylene-ethylene random copolymers, propylene-butylene random copolymers, ethylene-propylene-butylene terpolymers, polypropylene plastomers, polyethylene plastomers, LDPE, LLDPE, medium density polyethylene (MDPE), high density polyethylene (HDPE), VLDPE, mLLDPE, ethylene copolymers and terpolymers (including acrylates, esters, and other functional groups), ionomers, polyester, nylon, and combinations thereof.

As with the core, the skin layers may further comprise one or more additives, such as cavitating agents, opacifying agents, pigments, colorants, slip agents, antioxidants, anti-fog agents, anti-static agents, fillers, moisture barrier additives, gas barrier additives, and combinations thereof, as discussed in further detail below. Preferably, the total amount of additives, including cavitating agents, in the first skin layer ranges from about 0.2 wt % to about 60.0 wt %, more preferably from about 3.0 wt % to about 20.0 wt %.

The films herein may also be characterized in certain embodiments as being biaxially oriented. The films can be made by any suitable technique known in the art, such as a tentered or blown process, LISIM™, and others. Further, the working conditions, temperature settings, lines speeds, etc., will vary depending on the type and the size of the equipment used. Nonetheless, described generally here is one method of making the films described throughout this specification. In a particular embodiment, the films are formed and biaxially oriented using the "tentered" method. In the tentered process, line speeds of greater than 100 m/min to 400 m/min or more, and outputs of greater than 2000 kg/hr to 4000 kg/hr or more are achievable. In the tenter process, sheets/films of the various materials are melt blended and coextruded, such as through a 3, 4, 5, 7-layer die head, into the desired film structure. Extruders ranging in diameters from 100 mm to 300 or 400 mm, and length to diameter ratios ranging from 10:1 to 50:1 can be used to melt blend the molten layer materials, the melt streams then metered to the die having a die gap(s) within the range of from 0.5 or 1 to an upper limit of 3 or 4 or 5 or 6 mm. The extruded film is then cooled using air, water, or both. Typically, a single, large diameter roll partially submerged in a water bath, or two large chill rolls set at 20° C. or 30° C. to 40° C. or 50° C. or 60° C. or 70° C. are suitable cooling means. As the film is extruded, an air knife and edge pinning are used to provide intimate contact between the melt and chill roll.

Downstream of the first cooling step in this embodiment of the tentered process, the unoriented film is reheated to a temperature of from 80° C. to 100° C. or 120° C. or 150° C., in one embodiment by any suitable means, such as heated S-wrap rolls, and then passed between closely spaced differential speed rolls to achieve machine direction orientation. It is understood by those skilled in the art that this temperature range can vary depending upon the equipment, and in particular, upon the identity and composition of the components making up the film. Ideally, the temperature will be below that which will melt the film, or cause it to become tacky and adhere to the equipment, but high enough to facilitate the machine direction orientation process. Such temperatures, referred to herein, refer to the film temperature itself. The film temperature can be measured by using, for example, InfraRed spectroscopy, the source aimed at the film as it is being processed; those skilled in the art will understand that for transparent films, measuring the actual film temperature will not be as precise. In this case, those skilled in the art can estimate the temperature of the film by knowing the temperature of the air or roller immediately adjacent to the film measured by any suitable means. The heating means for the film line may be set at any appropriate level of heating, depending upon the instrument, to achieve the stated film temperatures.

The lengthened and thinned film is cooled and passed to the tenter section of the line for TD orientation. At this point, the edges of the sheet are grasped by mechanical clips on continuous chains and pulled into a long, precisely controlled hot air oven for a pre-heating step. The film temperatures range from 100° C. or 110° C. to 150° C. or 170° C. or 180° C. in the pre-heating step. Again, the temperature will be below that which will melt the film, or cause it to become tacky and adhere to the equipment, but high enough to facilitate the step of transverse direction orientation. Next, the edges of the sheet are grasped by mechanical clips on continuous chains and pulled into a long, precisely controlled hot air oven for transverse stretching. As the tenter chains diverge a desired amount to stretch the film in the transverse direction, the film temperature is lowered by at least 2° C. but typically no more than 20° C. relative to the pre-heat temperature to maintain the film temperature so that it will not melt the film. After stretching to achieve transverse orientation in the film, the film is then cooled from 5° C. to 10° C. or 15° C. or 20° C. or 30° C. or 40° C. below the stretching temperature, and the clips are released prior to edge trim, optional coronal, printing, and/or other treatment can then take place, followed by winding.

Thus, TD orientation is achieved by the steps of pre-heating the film having been machine oriented, followed by stretching it at a temperature below the pre-heat temperature of the film, and then followed by a cooling step at yet a lower temperature. In one embodiment, the films described herein are formed by imparting a transverse orientation by a process of first pre-heating the film, followed by a decrease in the temperature of the film within the range of from 2° C. or 3° C. to 5° C. to 10° C. or 15° C. or 20° C. relative to the pre-heating temperature while performing transverse orientation of the film, followed by a lowering of the temperature within the range of from 5° C. to 10° C. or 15° C. or 20° C. or 30° C. or 40° C. relative to the stretching temperature, holding or slightly decreasing (by no more than 5%) the amount of stretch, to allow the film to "anneal." The latter step imparts (reduces or minimizes) the high TD shrink characteristics of the films described herein, thus improving dimensional stability. In certain embodiments, the dimensional stability of the films described herein is within 15% or 10% or 8% at 135° C. after 7 minutes in either the MD or TD as otherwise measured by ASTM D1204. Thus, for example, where the pre-heat temperature is 120° C., the stretch temperature may be 114° C., and the cooling step may be 98° C., or any temperature within the ranges disclosed. The steps are carried out for a sufficient time to affect the desired film properties as those skilled in the art will understand.

The improved processability may be described by comparing the power and force required to extrude and stretch the film. In a particular embodiment, the film is made by a method comprising melt extruding a composition comprising polypropylene comprising from 0 wt % to 2 wt % comonomer-derived units, from 1 wt % to 20 wt %, by weight of the material in the extruder, of a propylene-α-olefin elastomer, and from 1 wt % to 20 wt %, by weight of the material in the extruder, of a hydrocarbon resin possessing a softening point of from greater than 100° C., wherein the extruder motor amperage is from at least 2% or 4% or 6% or 8% or 10% less than the extruder motor amperage when only the polypropylene is melt extruded through the same extruder; forming a film; and orienting the film in either the machine or transverse direction, wherein the amperage on the motor (e.g., tenter pulling in TDO or roller stretching in MDO) is from at least 5% or 10% or 15% or 20% less than the motor amperage when only the polypropylene is oriented in the same direction at the same temperature.

The method of forming the film may further include orienting the film in the transverse or machine direction (whichever direction not previously oriented), wherein the amperage on the motor (pulling or stretching) is from at least 5% or 10% or 15% or 20% less than the motor (pulling or stretching) amperage when only the polypropylene is oriented in the same direction at the same temperature, preferably from 80° C. or 90° C. to 105° C. or 110° C. for MD and from 130° C. or 140° C. to 160° C. or 170° C. for TD.

Finally, in certain embodiments, the back pressure on the extruder is from at least 2% or 4% or 6% or 8% less than the extruder back pressure when only the polypropylene is extruded as the core layer at the same temperature.

In certain embodiments, the film(s) described herein are biaxially oriented with at least a 5 or 6 or 7 or 8-fold TD orientation and at least a 2 or 3 or 4-fold MD orientation. Being so formed, the at least three-layer (one core, two skin layers, 18-23 μm thickness) possess an ultimate tensile strength within the range of from 20 or 25 to 38 or 45 or 50 kpsi in the TD in certain embodiments; and possess an ultimate tensile strength within the range of from 15 or 18 to 28 or 34 kpsi in the MD in other embodiments, measured according to ASTM D882. Further, the films described herein possess an MD % Elongation of within a range from 100% or 120% or 130% to 150% or 160% or 170% in certain embodiments, and the TD % Elongation of within a range from 40% or 45% or 50% to 60% or 70% or 80% or 90% in other embodiments, measured according to ASTM D882. Desirably, the inventive films maintain their original % Elongation to within 5% or 10% or 15% or 20%; and most preferably the inventive films maintain their % Elongation to within this range of the % Elongation of a similar polypropylene film without the hydrocarbon resin and propylene α-olefin elastomer. For example, a film comprising only a high crystallinity polypropylene should have nearly the same % Elongation (within 5% to 20%) as the films described herein comprising the high crystallinity polypropylene with the hydrocarbon resin and elastomer.

In particular embodiments, the film consisting essentially of the polypropylene, propylene-α-olefin elastomer, and hydrocarbon resin has a MD Tensile Modulus of at least 200 or 250 kpsi and a TD Tensile Modulus of at least 400 or 450 kpsi measured according to ASTM D882. In other particular embodiments, the water vapor transmission rate ("WVTR") of a film of a thickness of from 18 to 24 μm is less than 8 or 7 or 6 or 5 g/m²/24 hr at 38° C. and 90% RH measured according to ASTM F1249.

The films described herein are ideal for wrapping or "enveloping" an article or articles of manufacture. A common method of carrying this out is to use a so called "form, fill, and seal" apparatus (or "unit") which can be either "vertical" or "horizontal", thus abbreviated "VFFS" and "HFFS", respectively. In one embodiment is a method of enveloping an article(s) comprising: providing a vertical or horizontal form, fill, and seal apparatus having a drawing means for drawing a roll of film in its machine direction with a force of at least 150 or 200 or 250 kpsi; forming a pouch for receiving the article(s) by applying a force in the transverse direction of the film with a force of at least 150 or 200 or 300 or 350 or 400 or 450 kpsi; placing the article(s) in the pouch; and heat-sealing the pouch to envelope the article(s) with a heat-seal temperature of from 100° C. or 105° C. or 110° C. to 115° C. or 120° C. or 125° C. or 130° C.; wherein the film is oriented in at least one direction as wound in a roll, the film comprising a core layer comprising polypropylene comprising from 0 wt % to 0.5 wt % or 1 wt % or 2 wt % comonomer-derived units, from 1 wt % to 5 wt % or 8 wt % or 10 wt % or 20 wt %, by weight of the core layer, of propylene-α-olefin elastomer, and from 1 wt % to 5 wt % or 8 wt % or 10 wt % or 20 wt %, by weight of the core layer, of hydrocarbon resin possessing a softening point of from greater than 100° C. Methods of heat sealing are well known in the art, and the films disclosed herein are capable of forming seals having a seal strength of at least 600 or 800 or 1000 or 1100 g/inch.

To better illustrate the core compositions and films and methods of making the films described herein, the inventor has prepared these following examples:

EXAMPLES

The various components used in the basic core layer described herein are found in Table 1. All melt flow ratios ("MFR") are reported under ASTM D1238, 230° C. and 2.16 kg.

TABLE 1

Description of Components

| Component | Description | Source |
|---|---|---|
| PP-1 | propylene homopolymer, MP ~158-159° C., MFR = 2.8 g/10 min (230° C./2.16 kg) | ExxonMobil 4712 |
| PP-2 | high crystallinity propylene homopolymer, MP ~164-165° C., MFR = 3.2 g/10 min (230° C./2.16 kg) | Borealis HC110BF |
| PP-3 | high crystallinity propylene homopolymer, MP = 166° C., MFR = 3.5 g/10 min | Sunoco FF030F |
| α-PP1 | propylene-α-olefin elastomer, 9 wt % C2, MP = 79° C., $\Delta H_f$ = 33.5 J/g, MFR = 8 g/10 min (230° C./2.16 kg) | ExxonMobil Vistamaxx ™ |
| α-PP2 | propylene-α-olefin elastomer, 16 wt % C2, MP = 102° C., $\Delta H_f$ = 7.6 J/g, MFR = 3 g/10 min (230° C./2.16 kg) | ExxonMobil Vistamaxx ™ |
| α-PP3 | ethylene-propylene copolymer, 24 wt % C2, MP = 140° C., MFR = 7 g/10 min (230° C./2.16 kg) | Borealis Borosoft ™ SD 233CF |
| t-PP | propylene-ethylene-butene terpolymer, MP = 122.5° C. | Japan Polypropylene 7794 |
| HCR-1 | polymeric hydrocarbon resin, softening point 125° C., PP master batches containing 50% HCR | ExxonMobil Oppera ™ (PA-610) |
| HCR-2 | polymeric hydrocarbon resin, softening point 140° C., PP master batches containing 50% HCR | ExxonMobil Oppera ™ (PA-609) |

The components in Table 1 are combined, as well known in the art, in the amounts shown for the "Core Compositions" in the Tables below. Each film also includes a skin layer adhered to both sides of the core layer, thus forming a three-layer film having the core sandwiched therebetween. The skin layers comprise a $C_2C_3C_4$ terpolymer, either from Japan Polypropylene 7794 or 7510. The gauge ratios for the films are typically 3/72/5, where the total thickness is about 22 μm. The films were formed on a 3.5 inch (8.89 cm) with L/D ratio of 32:1, single flight, double compression screw with a Maddock mixing head, smooth bore. Other conditions are as in Tables 2 and 5 for the MD and TD orientation and extruder conditions.

All temperatures in Table 1 are set temperatures (and very close to the actual temperature; within 1° C.-3° C.), that is, the temperature at which the equipment is set. The "amps" are the measured amount of amperage necessary to stretch or extrude the material in the motors used to perform such stretching and extruding. When used, "MST" stands for "minimum seal temperature." Processability is demonstrated in part by the motor load on the main extruder and tenter frame (TDO) or roller motor (MDO), the amperage being lower for better processable core film compositions. A combination of low motor load (high processability) and high Modulus is sought.

Water vapor transmission rate was measured by a reliable method, such as ASTM F1249. In particular, WVTR may be measured with a Mocon PERMATRAN W600 instrument (available from Modern Controls, Inc., Elk River, Minn.) at 38° C. and 90% relative humidity.

Finally, in the Tables, all "core compositions" add up to 100 wt % of material.

TABLE 2

Composition and Processability of Examples 1-14

| Sample | Core Composition | | MDO | | TDO | | Main Extruder | | |
| --- | --- | --- | --- | --- | --- | --- | --- | --- | --- |
| | | | | | | | | psia, before | psia, after |
| No. | PP | Additive | °C. | amps | °C. | amps | amps | screen | screen |
| 1 | PP-1 | 0 | 93 | 10.1 | 173/161/160 | 16 | 101 | 1840 | 1770 |
| 2 | PP-1 | 4 wt % α-PP1 | 93 | 9.3 | 173/161/160 | 13 | 95 | 1910 | 1730 |
| 3 | PP-1 | 8 wt % α-PP1 | 93 | 9.0 | 171/159/160 | 14 | 92 | 1900 | 1730 |
| 4 | PP-1 | 4 wt % α-PP1 10 wt % HCR-1 | 93 | 8.4 | 167/156/160 | 14 | 89 | 1700 | 1600 |
| 5 | PP-1 | 8 wt % α-PP1 10 wt % HCR-1 | 93 | 8.6 | 167/156/160 | 16 | 89 | 2000 | 1600 |
| 6 | PP-1 | 4 wt % α-PP2 | 93 | 8.1 | 167/156/160 | 15 | 96 | 1930 | 1760 |
| 7 | PP-1 | 8 wt % α-PP2 | 93 | 8.1 | 167/156/160 | 14 | 94 | 1920 | 1750 |
| 8 | PP-1 | 4 wt % α-PP2 10 wt % HCR-1 | 93 | 7.1 | 167/156/160 | 14 | 84 | 1650 | 1530 |
| 9 | PP-1 | 8 wt % α-PP2 10 wt % HCR-1 | 93 | 7.9 | 167/156/160 | 15 | 92 | 1710 | 1600 |
| 10 | PP-2 | 0 | 102 | 11.1 | 176/163/160 | 15 | 97 | 1670 | 1590 |
| 11 | PP-2 | 4 wt % α-PP1 | 102 | 10.9 | 176/163/160 | 14 | 94 | 1680 | 1580 |
| 12 | PP-2 | 8 wt % α-PP1 | 102 | 10.4 | 176/163/160 | 13 | 98 | 1630 | 1570 |
| 13 | PP-2 | 4 wt % α-PP1 10t % HCR-1 | 102 | 10.2 | 176/163/160 | 14 | 82 | 1560 | 1500 |
| 14 | PP-2 | 8 wt % α-PP1 10 wt % HCR-1 | 102 | 10.1 | 176/163/160 | 13 | 92 | 1570 | 1500 |

TABLE 3

Physical Properties of Examples 1-14

| Sample | Thickness | WVTR, 100° F./90% RH - g/m² | tensile | | | | | | | Dimensional stability 135° C., 7 min | |
| --- | --- | --- | --- | --- | --- | --- | --- | --- | --- | --- | --- |
| | | | Modulus, kpsi | | ultimate tensile, kpsi | | % elongation | | | | |
| No. | micrometer | | MD | TD | MD | TD | MD | TD | Haze, % | MD | TD |
| 1 | 22 | 5.69 | 304 | 538 | 21.9 | 36.1 | 145 | 57 | 1.60 | −0.4 | −7.2 |
| 2 | 22 | 7.27 | 246 | 449 | 20.8 | 31.4 | 166 | 56 | 1.54 | −3.7 | −7.5 |
| 3 | 22 | 7.74 | 225 | 391 | 20.0 | 31.4 | 164 | 67 | 1.38 | −3.7 | −8.0 |
| 4 | 22 | 5.03 | 301 | 539 | 20.4 | 33.0 | 140 | 49 | 1.32 | −5.7 | −10.5 |
| 5 | 22 | 5.11 | 228 | 437 | 20.9 | 31.4 | 149 | 48 | 1.24 | −5.5 | −10.3 |
| 6 | 22 | 7.31 | 235 | 460 | 22.7 | 34.2 | 152 | 54 | 2.67 | −5.3 | −10.5 |
| 7 | 22 | 8.31 | 176 | 391 | 22.0 | 30.3 | 154 | 54 | 2.71 | −4.7 | −10.3 |
| 8 | 20 | 5.76 | 280 | 524 | 20.4 | 33.6 | 129 | 46 | 1.79 | −4.7 | −10.5 |
| 9 | 22 | 6.04 | 227 | 455 | 21.4 | 31.6 | 150 | 58 | 2.11 | −4.7 | −10.7 |
| 10 | 22 | 4.44 | 363 | 670 | 22.5 | 38.2 | 153 | 48 | 1.64 | −2.2 | −4.3 |
| 11 | 22 | 4.88 | 350 | 632 | 21.8 | 36.8 | 149 | 48 | 1.57 | −2.3 | −4.7 |
| 12 | 22 | 5.57 | 310 | 551 | 21.3 | 33.5 | 165 | 50 | 1.52 | −2.3 | −4.9 |

TABLE 3-continued

Physical Properties of Examples 1-14

| Sample No. | Thickness micrometer | WVTR, 100° F./90% RH - g/m² | Modulus, kpsi MD | Modulus, kpsi TD | ultimate tensile, kpsi MD | ultimate tensile, kpsi TD | % elongation MD | % elongation TD | Haze, % | Dimensional stability 135° C., 7 min MD | Dimensional stability 135° C., 7 min TD |
|---|---|---|---|---|---|---|---|---|---|---|---|
| 13 | 22 | 4.31 | 348 | 614 | 21.0 | 33.1 | 164 | 60 | 1.65 | −2.5 | −4.9 |
| 14 | 22 | 4.51 | 313 | 557 | 17.9 | 30.6 | 144 | 58 | 1.38 | −2.3 | −4.2 |

TABLE 4

Seal Properties of Examples 1-14

| Sample No. | Lako seal strength (g/in) 60 psi, 0.75 sec dwell, 20 sec cooling, vertical jaw 85° C. | 88° C. | 93° C. | 104° C. | 116° C. | 127° C. | 138° C. | MST, °C. | Lako hot tack (g/in) 60 psi, 0.75 sec dwell, 0 sec cooling, vertical jaw 93° C. | 104° C. | 116° C. | 127° C. | 138° C. |
|---|---|---|---|---|---|---|---|---|---|---|---|---|---|
| 1 | — | 114 | 275 | 754 | 828 | 1190 | 1240 | 195.2 | 170 | 322 | 428 | 376 | 375 |
| 2 | — | 173 | 285 | 871 | 1141 | 1195 | 1580 | 192.7 | 216 | 380 | 445 | 458 | 317 |
| 3 | 124 | 203 | 333 | 810 | 1270 | 1346 | 1500 | 189.8 | 188 | 348 | 439 | 431 | 305 |
| 4 | 119 | 234 | 378 | 934 | 1014 | 1235 | 1260 | 188.5 | 264 | 367 | 389 | 313 | 317 |
| 5 | 144 | 245 | 412 | 1000 | 1283 | 1230 | 1400 | 187.9 | 229 | 412 | 385 | 335 | 300 |
| 6 | — | 142 | 316 | 843 | 1050 | 1103 | 1110 | 193.3 | 159 | 254 | 436 | 357 | 329 |
| 7 | — | 151 | 338 | 834 | 1141 | 1354 | 1352 | 192.5 | 260 | 277 | 440 | 385 | 327 |
| 8 | 127 | 205 | 325 | 891 | 721 | 1142 | 1260 | 189.7 | 238 | 369 | 400 | 395 | 222 |
| 9 | — | 185 | 349 | 875 | 1328 | 1210 | 1256 | 190.9 | 216 | 358 | 426 | 350 | 256 |
| 10 | — | 144 | 226 | 565 | 585 | 556 | 747 | 197.8 | 171 | 292 | 367 | 355 | 345 |
| 11 | — | 136 | 284 | 566 | 627 | 630 | 851 | 194.4 | 182 | 310 | 387 | 370 | 364 |
| 12 | — | 166 | 290 | 595 | 748 | 996 | 1018 | 193.2 | 183 | 310 | 398 | 395 | 347 |
| 13 | — | 195 | 316 | 667 | 858 | 951 | 965 | 192 | 212 | 300 | 390 | 368 | 285 |
| 14 | — | 184 | 334 | 843 | 994 | 879 | 1201 | 191 | 214 | 380 | 381 | 358 | 261 |

TABLE 5

Composition and Processability of Examples 15-30

| Sample No. | Core composition PP | Core additives | MDO °C. | MDO amp | TDO °C. | TDO amp | main extruder amps | main extruder psia before screen | main extruder psia after screen |
|---|---|---|---|---|---|---|---|---|---|
| 15 | PP-1 | 0 | 93 | 9.3 | 173/161/160 | 15.1 | 99 | 1830 | 1720 |
| 16 | PP-1 | 10 wt % HCR-1 | 93 | 8.5 | 167/157/160 | 15.2 | 93 | 1690 | 1560 |
| 17 | PP-1 | 4 wt % α-PP1 10 wt % HCR-1 | 93 | 8.2 | 167/157/160 | 14.5 | 88 | 1620 | 1520 |
| 18 | PP-1 | 4 wt % t-PP | 93 | 8.5 | 171/160/160 | 16.5 | 104 | 1860 | 1700 |
| 19 | PP-1 | 4 wt % t-PP 10 wt % HCR-1 | 93 | 7.8 | 169/158/160 | 13.2 | 96 | 1680 | 1560 |
| 20 | PP-1 | 4 wt % α-PP3 | 93 | 8.9 | 169/158/160 | 15.9 | 98 | 1810 | 1680 |
| 21 | PP-1 | 4 wt % α-PP3 10 wt % HCR-1 | 93 | 8.1 | 169/158/160 | 16.2 | 97 | 1690 | 1560 |
| 22 | PP-2 | 0 | 102 | 10.2 | 177/164/160 | 13.9 | 98 | 1500 | 1510 |
| 23 | PP-2 | 5 wt % HCR-1 | 102 | 10.3 | 175/163/160 | 14.0 | 96 | 1490 | 1460 |
| 24 | PP-2 | 10 wt % HCR-1 | 102 | 10.8 | 174/162/160 | 13.6 | 92 | 1560 | 1520 |
| 25 | PP-2 | 4 wt % α-PP1 5 wt % HCR-2 | 102 | 10.7 | 172/161/160 | 14.1 | 88 | 1490 | 1490 |
| 26 | PP-3 | 4 wt % α-PP1 10 wt % HCR-2 | 102 | 10.2 | 172/161/160 | 15.2 | 99 | 1840 | 1730 |
| 27 | PP-3 | 4 wt % t-PP | 103 | n/m | 179/166/160 | 14.0 | 97 | 2060 | 1890 |
| 28 | PP-3 | 4 wt % t-PP 10 wt % HCR-2 | 103 | 11.0 | 175/162/160 | 13.3 | 112 | 1870 | 1760 |
| 29 | PP-3 | 4 wt % α-PP3 | 103 | 11.7 | 178/164/160 | 15.3 | 114 | 2000 | 1840 |
| 30 | PP-3 | 4 wt % α-PP3 10 wt % HCR-2 | 103 | n/m | — | 14.0 | n/m | 1900 | 1740 |

TABLE 6

Physical Properties of Examples 15-30

| Sample No. | Thickness micrometer | WVTR 100° F./90 RH, g/m² | tensile modulus, kpsi | | ultimate tensile, kpsi | | % elongation | | Haze % | Dimensional stability, 135° C., 7 min | |
|---|---|---|---|---|---|---|---|---|---|---|---|
| | | | MD | TD | MD | TD | MD | TD | | MD | TD |
| 15 | 22 | 5.9 | 310 | 546 | 20.0 | 36.1 | 130 | 54 | 1.5 | −4.7 | −8.8 |
| 16 | 22 | 4.6 | 342 | 618 | 19.3 | 35.5 | 121 | 52 | 1.4 | −4.8 | −12.0 |
| 17 | 22 | 5.0 | 287 | 544 | 18.7 | 33.4 | 131 | 60 | 1.5 | −6.0 | −11.7 |
| 18 | 22 | 6.5 | 284 | 504 | 18.9 | 35.4 | 121 | 57 | 2.9 | −5.7 | −10.0 |
| 19 | 22 | 5.0 | 308 | 572 | 17.4 | 33.8 | 111 | 51 | 2.0 | −6.3 | −11.0 |
| 20 | 22 | 6.6 | 280 | 510 | 20.1 | 36.5 | 126 | 61 | 1.7 | −5.5 | −10.7 |
| 21 | 22 | 5.0 | 291 | 546 | 18.5 | 33.3 | 123 | 57 | 1.5 | −5.3 | −9.7 |
| 22 | 22 | 5.0 | 353 | 613 | 19.1 | 36.8 | 141 | 50 | 1.6 | −2.3 | −4.7 |
| 23 | 22 | 4.4 | 360 | 661 | 17.7 | 36.5 | 126 | 43 | 1.5 | −2.5 | −5.0 |
| 24 | 22 | 4.2 | 348 | 652 | 17.7 | 36.9 | 129 | 43 | 1.6 | −3.3 | −6.0 |
| 25 | 22 | 4.6 | 354 | 651 | 17.9 | 36.0 | 122 | 50 | 1.6 | −3.3 | −5.7 |
| 26 | 22 | 4.9 | 348 | 614 | 21.0 | 33.1 | 164 | 60 | 1.7 | −2.5 | −4.9 |
| 27 | 22 | 4.8 | 319 | 570 | 19.5 | 36.4 | 143 | 55 | 2.5 | −4.5 | −6.5 |
| 28 | 22 | 4.1 | 334 | 672 | 18.2 | 37.7 | 132 | 49 | 2.5 | −4.3 | −6.2 |
| 29 | 22 | 5.1 | 321 | 607 | 18.8 | 37.9 | 128 | 48 | 2.0 | −3.2 | −5.0 |
| 30 | 22 | 4.3 | 342 | 638 | 18.5 | 35.4 | 133 | 50 | 1.7 | −2.7 | −4.5 |

These data demonstrate that neither the propylene-α-olefin elastomer alone, nor the hydrocarbon resin alone, provide the combination of processability and high Modulus that is desired. The Japan Polypropylene ethylene-propylene-butene terpolymer provides only a minor improvement in modulus, but not as much in processability as judged by the motor load on the extruder.

Having described the various features of the core compositions, films and methods of making the films, embodiments of these are set forth in numbered paragraphs:

1. A film oriented in at least one direction, the film comprising:
   a core layer comprising:
   polypropylene comprising from 0 wt % to 0.5 wt % or 1 wt % or 2 wt % comonomer-derived units,
   from 1 wt % to 5 wt % or 8 wt % or 10 wt % or 20 wt %, by weight of the core layer, of propylene-α-olefin elastomer, and
   from 1 wt % to 5 wt % or 8 wt % or 10 wt % or 20 wt %, by weight of the core layer, of hydrocarbon resin possessing a softening point of from greater than 100° C.
2. The oriented film of numbered embodiment 1, wherein the core layer consists essentially of one polypropylene, one propylene-elastomer, and one hydrocarbon resin.
3. The oriented film of numbered embodiments 1 and 2, wherein the polypropylene has a melt flow rate (230° C., 2.16 kg, ASTM D1238) within the range of from 0.1 or 0.5 or 1 to 4 or 6 or 8 or 10 or 12 or 16 or 20 g/10 min.
4. The oriented film of any of the preceding numbered embodiments, wherein the polypropylene is a highly crystalline polypropylene homopolymer having a melting point of from greater than 140° C. or 145° C. or 150° C. or 155° C. or 160° C. or 165° C.
5. The oriented film of any of the preceding numbered embodiments, wherein the softening point of the hydrocarbon resin is greater than 110° C. or 120° C.; or within a range of from 100° C. or 110° C. or 120° C. to 150° C. or 160° C. or 180° C. or 200° C.
6. The oriented film of any of the preceding numbered embodiments, wherein the glass transition temperature, Tg, of the hydrocarbon resin is greater than 25° C. or 30° C. or 35° C. or 40° C. or 50° C.
7. The oriented film of any of the preceding numbered embodiments, wherein the propylene-α-olefin elastomer comprises from 8 wt % or 10 wt % or 12 wt % to 16 wt % or 18 wt % or 20 wt % or 25 wt % ethylene-derived units.
8. The oriented film of any of the preceding numbered embodiments, wherein the propylene-α-olefin elastomer has a melting point of less than 140° C. or 130° C. or 120° C. or 110° C. or 100° C.
9. The oriented film of any of the preceding numbered embodiments, wherein the film consisting essentially of the polypropylene, propylene-α-olefin elastomer, and hydrocarbon resin has a MD Tensile Modulus of at least 200 or 250 kpsi and a TD Tensile Modulus of at least 400 or 450 kpsi.
10. The oriented film of any of the preceding numbered embodiments, wherein a film having a thickness of from 18 to 24 μm has a WVTR of less than 18 to 24 μm is less than 8 or 7 or 6 or 5 g/m²/24 hr at 38° C. and 90% RH.
11. The oriented film of any of the preceding numbered embodiments, wherein the core layer has a first and second side; and further the film comprises (or consists essentially of) one or more skin layers adjacent to each of the first and second sides, the skin layers comprising (or consisting essentially of) a polyethylene, a propylene-ethylene-butene terpolymer, or a blend thereof.
12. A method of forming a film comprising:
    melt extruding a composition comprising (a) polypropylene comprising from 0 wt % to 2 wt % comonomer-derived units, (b) from 1 wt % to 20 wt %, by weight of the material in the extruder, of a propylene-α-olefin elastomer and (c) from 1 wt % to 20 wt %, by weight of the material in the extruder, of a hydrocarbon resin possessing a softening point of from greater than 100° C.; wherein the extruder motor amperage is from at least 2% less than the extruder motor amperage when only the polypropylene is melt extruded through the same extruder;
    forming a film; and
    orienting the film in either the machine or transverse direction, wherein the amperage on the pulling motor is from at least 5% less than the pulling motor amperage when only the polypropylene is oriented in the same direction at the same temperature.

13. The method of forming an oriented film of numbered embodiment 12, comprising orienting the film in the transverse or machine direction (whichever direction not previously oriented), wherein the amperage on the pulling motor is from at least 5% or 10% or 15% or 20% less than the extruder motor amperage when only the polypropylene is oriented in the same direction at the same temperature.
14. The method of forming an oriented film of any of the preceding numbered embodiments 12-13, wherein the back pressure on the extruder is from at least 2% or 4% or 6% or 8% less than the extruder back pressure when only the polypropylene is extruded.
15. The method of forming an oriented film of the preceding numbered embodiments 12-14, wherein the core layer consists essentially of one polypropylene, one propylene-elastomer, and one hydrocarbon resin.
16. The method of forming an oriented film of any of the preceding numbered embodiments 12-15, wherein the polypropylene has a melt flow rate (230° C., 2.16 kg, ASTM D1238) within the range of from 0.1 or 0.5 or 1 to 4 or 6 or 8 or 10 or 12 or 16 or 20 g/10 min.
17. The method of forming an oriented film of any of the preceding numbered embodiments 12-16, wherein the polypropylene is a highly crystalline polypropylene homopolymer having a melting point of greater than 140° C. or 145° C. or 150° C. or 155° C. or 160° C. or 165° C.
18. The method of forming an oriented film of any of the preceding numbered embodiments 12-17, wherein the softening point of the hydrocarbon resin is greater than 110° C. or 120° C.; or within a range of from 100° C. or 110° C. or 120° C. to 150° C. or 160° C. or 180° C. or 200° C.
19. The method of forming an oriented film of any of the preceding numbered embodiments 12-18, wherein the glass transition temperature, Tg, of the hydrocarbon resin is greater than 25° C. or 30° C. or 35° C. or 40° C. or 50° C.
20. The method of forming an oriented film of any of the preceding numbered embodiments 12-19, wherein the propylene-α-olefin elastomer comprises from 8 wt % or 10 wt % or 12 wt % to 16 wt % or 18 wt % or 20 wt % or 25 wt % ethylene-derived units.
21. The method of forming an oriented film of any of the preceding numbered embodiments 12-20, wherein the propylene-α-olefin elastomer has a melting point of less than 140° C. or 130° C. or 120° C. or 110° C. or 100° C.
22. The method of forming an oriented film of any of the preceding numbered embodiments 12-21, wherein the film consisting essentially of the polypropylene, propylene-α-olefin elastomer, and hydrocarbon resin has a MD Tensile Modulus of at least 200 or 250 kpsi and a TD Tensile Modulus of at least 400 or 450 kpsi.
23. The method of forming an oriented film of any of the preceding numbered embodiments 12-22, wherein a film having a thickness of from 18 to 24 μm has a WVTR of less than 8 or 7 or 6 or 5 g/m²/24 hr at 38° C. and 90% RH.
24. The method of forming an oriented film of any of the preceding numbered embodiments 12-23, wherein the core layer has a first and second side; and further the film comprises (or consists essentially of) one or more skin layers adjacent to each of the first and second sides, the skin layers comprising (or consists essentially of) a polyethylene, a propylene-ethylene-butene terpolymer, or a blend thereof
25. A method of enveloping an article(s) comprising:
    providing a vertical or horizontal form, fill, and seal apparatus having a drawing means for drawing a roll of film in its machine direction with a force of at least 150 kpsi;
    forming a pouch for receiving the article(s) by applying a force in the transverse direction of the film with a force of at least 150 kpsi;
    placing the article(s) in the pouch; and
    heat-sealing the pouch to envelope the article(s) with a heat-seal temperature of from 100° C. to 130° C.;
    wherein the film is oriented in at least one direction as wound in a roll, the film comprising a core layer comprising polypropylene comprising from 0 wt % to 2 wt % comonomer-derived units, from 1 wt % to 20 wt %, by weight of the core layer, of propylene-α-olefin elastomer, and from 1 wt % to 20 wt %, by weight of the core layer, of hydrocarbon resin possessing a softening point of from greater than 100° C.
26. The method of numbered embodiment 25, wherein the heat seal strength is at least 600 or 800 or 1000 or 1100 g/inch.
27. The method of numbered embodiments 25 and 26, wherein the core layer of the film also comprises from 1 wt % to 5 wt % or 8 wt % or 10 wt % or 20 wt %, by weight of the core layer, of hydrocarbon resin possessing a softening point of from greater than 100° C.
28. The method of the preceding numbered embodiments 25-27, wherein the core layer consists essentially of one polypropylene, one propylene-elastomer, and one hydrocarbon resin.
29. The method of the preceding numbered embodiments 25-28, wherein the polypropylene has a melt flow rate (230° C., 2.16 kg, ASTM D1238) within the range of from 0.1 or 0.5 or 1 to 4 or 6 or 8 or 10 or 12 or 16 or 20 g/10 min.
30. The method of the preceding numbered embodiments 25-29, wherein the polypropylene is a highly crystalline polypropylene homopolymer having a melting point of greater than 140° C. or 145° C. or 150° C. or 155° C. or 160° C. or 165° C.
31. The method of the preceding numbered embodiments 25-30, wherein the softening point of the hydrocarbon resin is greater than 110° C. or 120° C.; or within a range of from 100° C. or 110° C. or 120° C. to 150° C. or 160° C. or 180° C. or 200° C.
32. The method of the preceding numbered embodiments 25-31, wherein the glass transition temperature, Tg, of the hydrocarbon resin is greater than 25° C. or 30° C. or 35° C. or 40° C. or 50° C.
33. The method of the preceding numbered embodiments 25-32, wherein the propylene-α-olefin elastomer comprises from 8 wt % or 10 wt % or 12 wt % to 16 wt % or 18 wt % or 20 wt % or 25 wt % ethylene-derived units.
34. The method of the preceding numbered embodiments 25-33, wherein the propylene-α-olefin elastomer has a melting point of less than 140° C. or 130° C. or 120° C. or 110° C. or 100° C.
35. The method of the preceding numbered embodiments 25-34, wherein the film consisting essentially of the polypropylene, propylene-α-olefin elastomer, and hydrocarbon resin has a MD Tensile Modulus of at least 200 or 250 kpsi and a TD Tensile Modulus of at least 400 or 450 kpsi.
36. The method of the preceding numbered embodiments 25-35, wherein a film having a thickness of from 18 to 24 μm has a WVTR of less than 18 to 24 μm is less than 8 or 7 or 6 or 5 g/m²/24 hr at 38° C. and 90% RH.
37. The method of the preceding numbered embodiments 25-36, wherein the core layer has a first and second side; and further the film comprises (or consists essentially of) one or more skin layers adjacent to each of the first and second sides, the skin layers comprising (consisting essentially of) a polyethylene, a propylene-ethylene-butene terpolymer, or a blend thereof.

The invention claimed is:
1. A film having a core layer comprising:
polypropylene comprising from 0 wt % to 2 wt % comonomer-derived units;
from 1 wt % to 20 wt %, by weight of the core layer, of propylene-α-olefin elastomer; and
from 1 wt % to 20 wt %, by weight of the core layer, of hydrocarbon resin possessing a softening point of from greater than 100° C.,
wherein the film is biaxially oriented,
wherein the film has a thickness of from 18 to 24 μm and a WVTR of less than 8 g/m$^2$/24 hr at 38° C. and 90% RH.
2. The film of claim 1, wherein the core layer consists essentially of one polypropylene, one propylene-elastomer, and one hydrocarbon resin.
3. The film of claim 1, wherein the polypropylene has a melt flow rate (230° C., 2.16 kg, ASTM D1238) within the range of from 0.1 to 10 g/10 min.
4. The film of claim 1, wherein the polypropylene is a highly crystalline polypropylene homopolymer having a melting point of from greater than 140° C.
5. The film of claim 1, wherein the softening point of the hydrocarbon resin is greater than 110° C.
6. The film of claim 1, wherein the glass transition temperature, $T_g$, of the hydrocarbon resin is greater than 25° C.
7. The oriented film of claim 1, wherein the propylene-α-olefin elastomer comprises from 8 wt % to 25 wt % ethylene-derived units.
8. The film of claim 1, wherein the propylene-α-olefin elastomer has a melting point of less than 140° C.
9. The film of claim 1, wherein the film consisting essentially of the polypropylene, propylene-α-olefin elastomer, and hydrocarbon resin has a MD Tensile Modulus of at least 200 kpsi and a TD Tensile Modulus of at least 400 kpsi.
10. The film of claim 1, wherein the core layer has a first and second side; and further the film comprises one or more skin layers adjacent to each of the first and second sides, the skin layers comprising a polyethylene, a propylene-ethylene-butene terpolymer, or a blend thereof.

* * * * *